F. B. HART.
PORTABLE LIFTING DEVICE AND CARRIER FOR AUTOMOBILES.
APPLICATION FILED AUG. 23, 1917.
1,304,680.  Patented May 27, 1919.
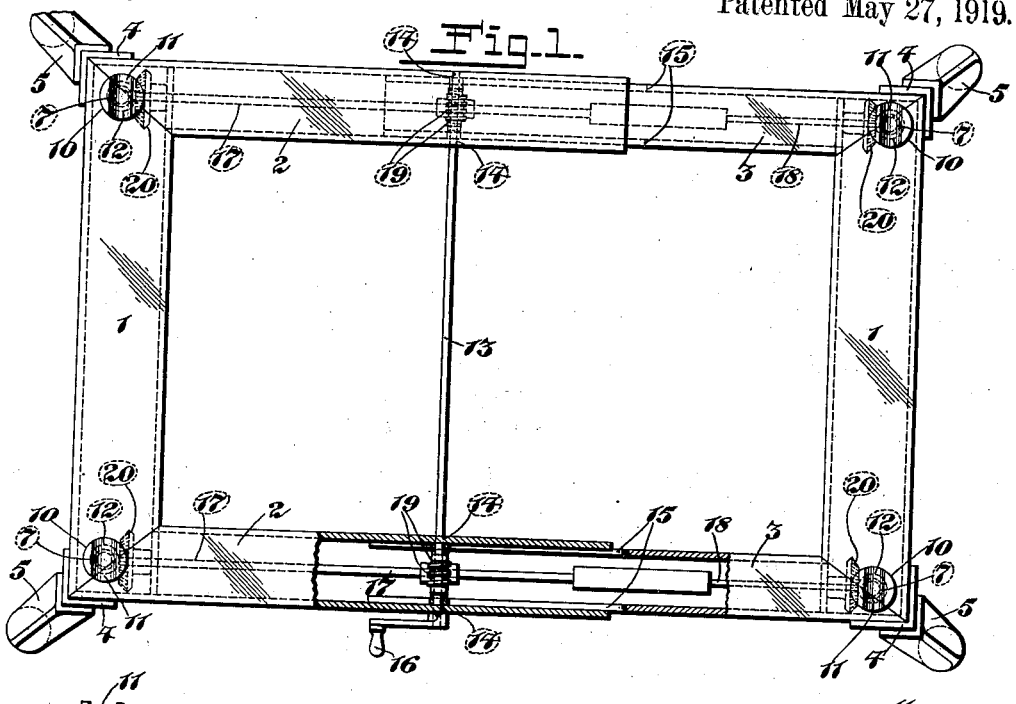
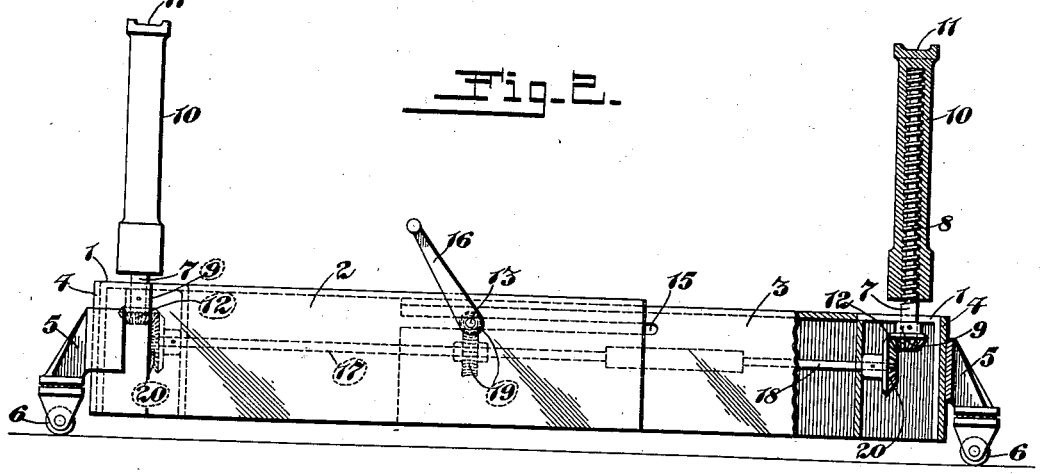
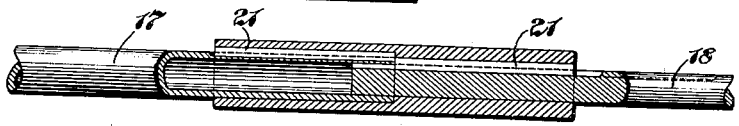
Attest.
Charles A. Becker
Inventor.
Frank B. Hart,
By Pippey Kingsland
His Attorneys.

UNITED STATES PATENT OFFICE.

FRANK B. HART, OF POPLAR BLUFF, MISSOURI.

PORTABLE LIFTING DEVICE AND CARRIER FOR AUTOMOBILES.

1,304,680.　　　　　Specification of Letters Patent.　　Patented May 27, 1919.

Application filed August 23, 1917. Serial No. 187,769.

*To all whom it may concern:*

Be it known that I, FRANK B. HART, a citizen of the United States, residing at the city of Poplar Bluff, Butler county, and State of Missouri, have invented a new and useful Portable Lifting Device and Carrier for Automobiles, of which the following is a specification.

This invention relates to improvements in portable lifting devices and carriers for automobiles, and consists in the novel construction and arrangement of parts hereinafter disclosed.

An object of the invention is to provide a construction arranged to be placed beneath an automobile, and operable to lift the wheels of the automobile from the floor, whereby access to the under part thereof may be had, and also to permit the automobile to be moved from place to place.

Another object is to provide a device of the character mentioned that will be adjustable for automobiles of various lengths of wheel base, so that one standard device will be adaptable for use with any automobile.

Another object is to equip a device of the character mentioned with power mechanism, whereby the automobile may be lifted complete from the floor by simultaneous operation of the lifting devices.

With the foregoing objects, as well as other advantages attainable from the construction in view, I have designed and arranged the structure hereinafter described, reference being made to the accompanying drawings, in which:—

Figure 1 is a plan view, partially in section, illustrating a construction embodying the invention.

Fig. 2 is a side elevation, partially in section, illustrating further details of the construction.

Fig. 3 is an enlarged section illustrating certain details of construction.

In the embodiment of the invention illustrated in the drawing the construction includes a rectangular frame comprising end members 1, and side members formed from telescoping sections 2 and 3. The end members 1 and the sections 2 and 3 of the side members are preferably made in the form of U-shaped channel irons. The chanel sections 2 of the side members are wider than the outside width of the sections 3 so that the sections 3 seat within the channels of the sections 2, thereby permitting the frame to be expanded and contracted lengthwise to conform to the different lengths of the wheel base of the various types of automobiles. The end and side members are rigidly secured together at the ends by angle plates 4, thereby forming a rigid frame of substantial strength. At the four corners of the frame roller brackets 5 are attached thereto, said brackets carrying rollers 6. This construction permits the frame to be readily moved from place to place.

At each corner of the frame and extending vertically from the top face of the frame are shafts 7 having screw sections 8. The lower ends of the shafts 7 are mounted in journals 9 carried in the frame. An internally threaded sleeve 10 is fitted over each of the shafts 7 coöperating with the screw sections 8 of the shafts 7 to raise and lower the sleeves when the shafts are rotated. The upper ends of the sleeves 10 are solid, having a channel 11 therein to adapt them to engage under the axles of the automobile. The lower end of each of the shafts 7 has a miter gear 12 affixed thereto.

The power mechanism for driving the gears 12 and thereby rotating the shafts 7 to raise and lower the sleeves 10, includes a shaft 13 journaled transversely of the frame in bearings 14 in the side members 2. The side walls of the members 3 have longitudinal slots 15 therein through which the shaft 13 extends, thereby permitting the expansion and contraction of the frame without interfering with the alinement of the shaft 13. The shaft 13 is equipped with a handle 16 attached to one end thereof which extends beyond the side of the frame.

Transmission shafts 2 composed of two telescoping sections 17 and 18, are journaled in the frame below the shaft 13, in such a manner that one expansible transmission shaft extends longitudinally of the frame below each side member. Two sets of worm gear connections 19 connect the power shaft 13 with the transmission shafts. The transmission shafts are equipped at their ends with miter gears 12. The two sections of the transmission shafts have key construction 21, whereby the two sections of the said shafts are rotated together, yet are slidable longitudinally of each other when the frame is contracted or expanded.

From the above description it will be seen that the device may be readily placed beneath the chassis of an automobile, with the ends of the elevating jack screws beneath the axles or other rigid portion of the frame of the car. By rotating the handle 16 the jack screws will simultaneously elevate the entire automobile from the floor. The automobile will be held in elevated position until lowered by reverse operation of the power shaft. The device may be used to elevate the automobile so that access may be had to the under part of the car for repair and inspection, and for moving the automobile from place to place.

I am aware that the invention may be embodied in structure differing in details from that illustrated and described without departing from the spirit and scope of the invention. I do not limit myself therefore, to the exact construction shown and described but what I claim as my invention is:—

1. A device of the character described comprising a frame composed of end members, inverted U-shaped side members secured to one of the end members, inverted U-shaped side members secured to the other end member and telescoping within and being movable longitudinally relative to the first-named side members, and having slots in the side portions thereof; a transverse shaft journaled in the first-named side members and extending through said slots in the second-named side members and supporting the second-named side members within the first ones; a vertical shaft journaled for rotation near each corner of said frame; a horizontal shaft geared to the vertical shafts on each side of the frame; a worm on each of said horizontal shafts; and worms on the transverse shaft engaging the worms on the horizontal shafts for rotating said horizontal shafts and thereby said vertical shafts simultaneously.

2. A device of the character described comprising a frame composed of end members, U-shaped side members attached to one of the end members, U-shaped side members attached to the other end member telescoping within and being movable longitudinally relative to the first-named side members, and rollers supporting and permitting free and easy movement of said frame upon a floor; a vertical shaft journaled for rotation near each corner of said frame; a pinion on the lower end of each of said shafts; a transverse shaft journaled in said side members and holding them in telescoped adjustment and permitting relative longitudinal movement thereof; a shaft extending longitudinally at each side of the frame between the arms of said U-shaped side members; pinions on the ends of said last-named shafts meshing with the pinions on the vertical shafts respectively; gearing whereby said transverse shaft will rotate said longitudinal shafts; and means for rotating said transverse shaft.

3. A device of the character described, comprising a frame composed of end members, U-shaped side members attached to one of the end members, U-shaped side members attached to the other end member telescoping within and being movable longitudinally relative to the first-named side members, and rollers supporting and permitting free and easy movement of said frame upon a floor; a vertical shaft journaled for rotation near each corner of said frame; a pinion on the lower end of each of said shafts; a transverse shaft journaled in said side members and holding them in telescoped adjustment and permitting relative longitudinal movement thereof; a shaft extending longitudinally at each side of the frame between the arms of said U-shaped side members; pinions on the ends of said last-named shafts meshing with the pinions on the vertical shafts, respectively; gearing whereby said transverse shaft will rotate said longitudinal shafts; means for rotating said transverse shaft; and a sleeve inclosing and having threaded engagement with each of said vertical shafts whereby said sleeves are moved axially when said vertical shafts are rotated.

In witness whereof, I have signed this specification.

FRANK B. HART.